United States Patent [19]

Kang

[11] Patent Number: 4,785,906

[45] Date of Patent: Nov. 22, 1988

[54] SEAT BELT BUCKLE HAVING A BUILT-IN MICROSWITCH

[76] Inventor: Choong S. Kang, #1558-1 Bongchun-dong, Kwanak-ku, Seoul, Rep. of Korea

[21] Appl. No.: 74,626

[22] Filed: Jul. 17, 1987

[30] Foreign Application Priority Data

May 29, 1987 [KR] Rep. of Korea .............. 8721

[51] Int. Cl.⁴ .............................................. B60R 21/10
[52] U.S. Cl. ....................................... 180/270; 24/634
[58] Field of Search ................... 180/270, 268; 24/602, 24/603, 634, 647

[56] References Cited

U.S. PATENT DOCUMENTS

| | | | |
|---|---|---|---|
| 3,177,547 | 4/1965 | Wisniewski | 24/647 |
| 3,523,342 | 8/1970 | Spires | 24/634 |
| 3,624,601 | 11/1971 | Routzahn et al. | 180/270 |
| 3,831,140 | 8/1974 | Anderson, Jr. et al. | 180/270 |
| 3,833,781 | 9/1974 | Rumpf | 24/603 |
| 3,840,849 | 10/1974 | Lohr | 180/270 |
| 4,441,236 | 4/1984 | Bron | 24/602 |

FOREIGN PATENT DOCUMENTS 2617236  11/1977  Fed. Rep. of Germany ...... 180/270

Primary Examiner—John J. Love
Assistant Examiner—Ross Weaver
Attorney, Agent, or Firm—Price, Heneveld, Cooper, DeWitt & Litton

[57] ABSTRACT

A seat belt buckling system has a switch mechanism in the seat belt anchor plate which prevents starting of the engine until the seat belt has been buckled. The switch mechanism includes a switch controlling actuation of the starter which is only closed by insertion of the anchor plate on the belt into the buckle locking system. Means are provided to lock the plate into the buckle locking mechanism when it has been inserted sufficiently to permit starting of the engine. A rockable latch member within the locking system is actuated by a manually manipulable key plate which plate, when pressed downwardly, will permit the anchor plate to be released without interrupting the ignition after the engine has been started.

2 Claims, 3 Drawing Sheets

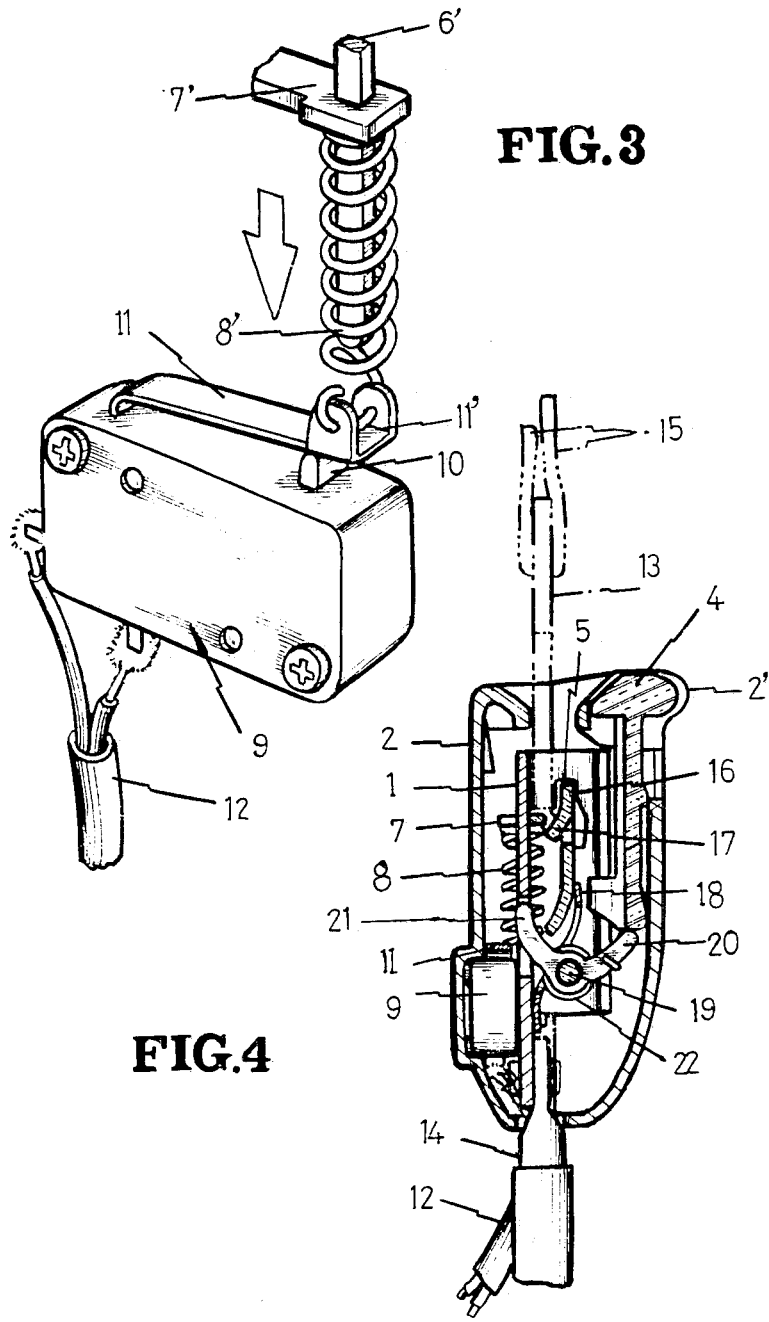

SEAT BELT BUCKLE HAVING A BUILT-IN MICROSWITCH

FIELD OF APPLICATION OF THE INVENTION

The present invention relates to a novel belt buckle having a built-in microswitch which is interconnected with the ignition switch and the starter motor in such a fashion that the engine won't start before the driver turns the ignition key after sitting on the seat and buckling the seat belt, whereby the drivers can not but fasten the seat belts on their own initiative, even if the fastening of the vehicle seat belts while driving were not compulsory by law.

BACKGROUND OF THE INVENTION

Heretofore, many traffic accidents have caused fatal wounds, or, if not deaths, resulted in serious injuries to maim the injured persons due to the non-use of seat belts while driving cars. However, in spite of fatal accidents, most drivers are apt to drive their cars without fastening seat belts from reasons of cumbersomeness and inconvenience.

It is, accordingly, an object of the present invention to provide an improved seat belt buckle for vehicles which will prevent the engine from starting when the ignition key is turned, if seat belts are not buckled, wherein the starter motor can be actuated by turning the ignition key only after the driver fastens the seat belt.

It is, therefore, another object of the present invention to safeguard the life of drivers to the utmost at an unexpected accident.

DETAILED DESCRIPTION OF THE INVENTION

The present invention may best be understood by reference to the following detailed description taken in connection with the accompanying drawings wherein:

FIG. 3 shows an enlarged, partially fragmentary, perspective view of a built-in microswitch in operating relationship with a push plate and a coil spring of the buckle body in accordance with the present invention; and FIG. 4 shows a sectional side view of the belt buckle in accordance with the present invention.

Figure 1:
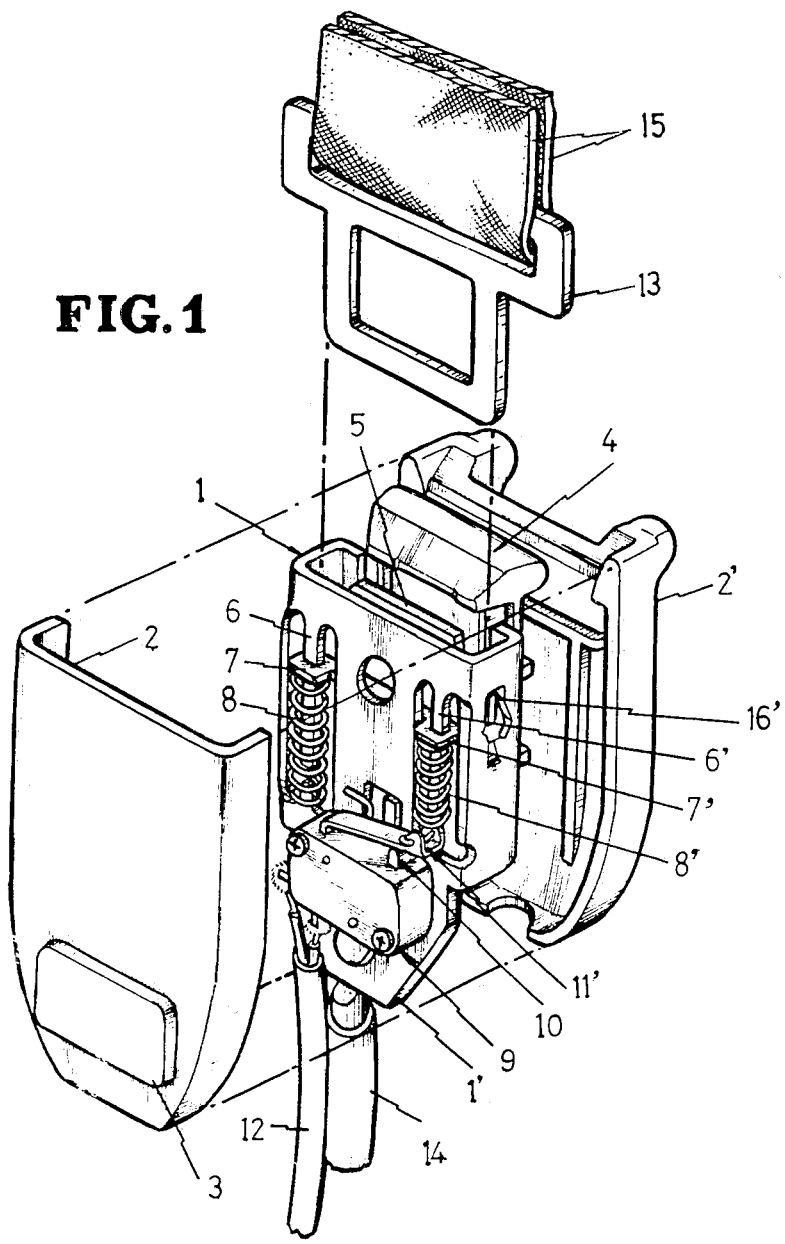
FIG. 1 shows an exploded perspective view of a belt buckle in accordance with the present invention.
Figure 2:
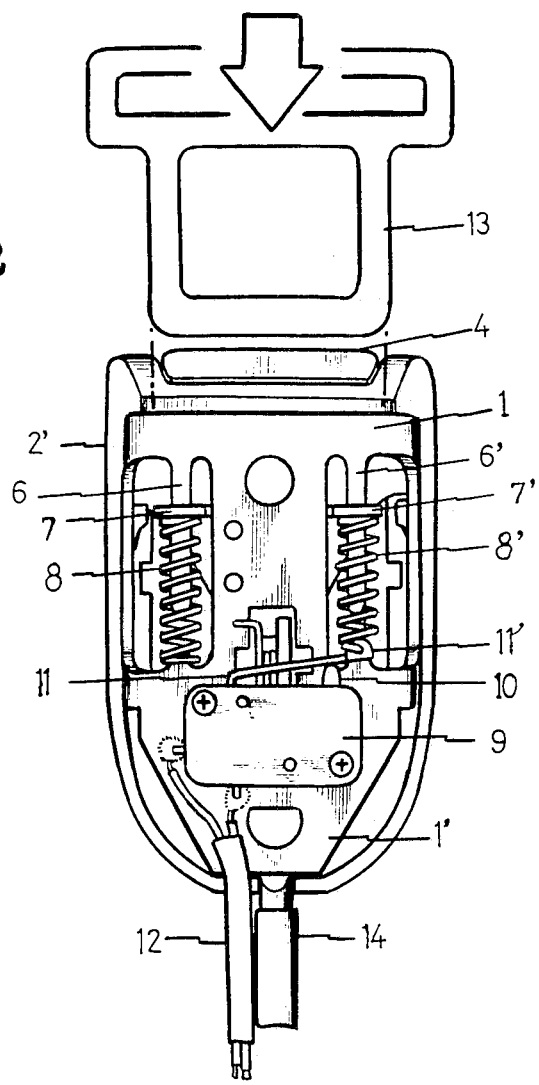
FIG. 2 shows a front elevational view illustrating the inner buckle body in accordance with the present invention.

The FIG. 1 illustrates an exploded perspective view of a vehicle seat belt buckle, wherein the inner buckle body 1 is housed by the front and rear covers 2, 2'.

Referring further to FIGS. 1 to 4, a vacillating lever assembly having a support arm 20 on the one side and a push lever 21 on the other side is provided on the lower part of the buckle body 1 by means of a pintle 19, wherein said vacillating lever assembly is fitted with a torsion coil spring 22 which pushes up said support arm 20 against the lower part of a key plate 4.

Said belt buckle body 1 includes also a latch plate 5 having a latch hook 17 formed on the front upper part and a pair of eared, upper side-ends on both sides thereof, wherein said eared, upper side-ends are each movably received through perspective side apertures 16, 16' of said buckle body 1 to be guided therein, and said latch plate 5 is pushed forward (leftward in FIG. 4) from behind by a plate spring 18, Said buckle body 1 includes further a pair of guide bars 6, 6' formed in parallel at a proper interval on the front wall of said buckle body 1, wherein both guide bars 6, 6' are each provided with respective coil springs 8, 8', and a pair of push plates 7, 7' which are formed integrally and are slidably mounted on said guide bars 6, 6' on the tops of said coil springs 8, 8'.

Furthermore, said buckle body 1 includes a microswitch 9 provided on the lower end plate 1' of said buckle body 1. The microswitch 9 comprises a switch lever 11, the end 11' of which is connected to the end of said coil spring 8', and a switch button 10 which is positioned under and activated by said switch lever end 11'.

Besides, said microswitch 9 has an electric wire 12 which is electrically interconnected with the ignition switch as well as the starter motor.

Finally, a fixing or anchor cord 14 is rigidly connected to the lower end plate 1' of said buckle body 1 and the other end of said anchor cord 14 will be fixed to the vehicle bottom plate on the right or left side of the driver's seat.

To explain the operation of said seat belt buckle in accordance with the present invention, since said built-in microswitch 9 is electrically interconnected with the ignition switch and the starter motor, the engine cranks only when the ignition key is turned on after buckling the seat belt 15. In other words, the engine won't crank when the driver merely turns the ignition key to the "ON" position without buckling the seat belt 15.

Referring to FIG. 4, when the fastening ring 13 of said seat belt 15 is inserted into said belt buckle, between the latch plate 5 and the front wall of said buckle body 1, the a forehead of said fastening ring 13 pushes down on said push plates 7,7', whereby said coil spring 8' is pushed down to activate said switch lever 11 and at the same time said lever end 11' actuates said switch button 10 thereby, the interconnected electrical circuit consisting of said built-in buckle switch, the ignition switch and the starter motor is ready to be activated when turning the ignition key.

At the same time, said fastening ring 13 of said seat belt 15 is caught by said latch hook 17 of said latch plate 5, and said latch plate 5 is pushed forward (leftward in FIG. 4) by said plate spring 18, thereby locking the seat belt assembly.

To unfasten said seat belt 15, when said key plate 4 is pushed down, said support arm 20 is pivoted downwards while said push lever 21 is pivoted upwardly to push said latch plate 5 (rearwardly to the right in FIG. 4), whereby said latch hook 17 is released from said fastening ring 13, thereby unfastening said seat belt 15.

After the engine is once cranked, it will continue to run, and said seat belt 15 can be unbuckled, allowing the vehicle to start, be driven and stopped.

As can be clearly understood in the above detailed description, while the invention has been described with reference to specific emboidments, it will be apparent to those skilled in the art that various changes and modifications may be made and equivalents may be substituted for elements thereof without departing from true spirit and scope of the present invention.

I claim:

1. A seat belt buckle for vehicles comprising:
   a buckle body 1 being housed by the front and rear outer covers 2, 2', a vacillating lever assembly having a support arm 20 on the one side and a push lever 21 on the other side is provided on the lower part of said buckle body 1 by means of a pintle 19, wherein said vacillating lever assembly is fitted with torsion coil spring 22 which pushes up said support arm 20 against the lower part of a key plate 4, a latch plate 5 having a latch hook 17 formed on the front upper part thereof and a pair of eared upper ends on both sides thereof, wherein said eared upper side-ends are each movably received through respective side apertures 16, 16' of said buckle body 1 to be guided therein, and said latch plate 5 is pushed forwards (left-wards in FIG. 4) from behind by a plate spring 18, a pair of guide bars 6, 6' formed in parallel at a proper interval on the front wall of said buckle body 1, wherein both guide bars 6, 6' are each fitted with respective coil springs 8, 8' on the tops of which a pair of push plates 7, 7' are each slidably mounted on said respective guide bars 6, 6', said push plates 7, 7' being integrally formed, a fixing cord 14 rigidly connected to said lower end plate 1' of said buckle body 1, wherein the other end of said fixing cord 14 is fixed to the vehicle bottom plate on the right or left side of the driver's seat, and a microswitch 9 having a switch lever 11 and a switch button 10 which is provided on the lower end plate 1' of said buckle body 1, wherein the lever end 11' of said microswitch 9 is connected to the lower end of said coil spring 8', and said lever end 11' will activate said switch button 10 when said fastening ring 13 of the seat belt 15 is inserted into the belt buckle, between said latch plate 5 and the front wall of said buckle body 1, whereby the forehead of said fastening ring 13 pushes down on said push plates 7, 7' together with said coil springs 8, 8', thereby activating said lever end 11' and at the same time said switch button 10, characterized in that said microswitch 9 is electrically interconnected with the ignition switch as well as the starter motor.

2. A seat belt buckle according to claim 1, wherein said built-in microcswitch 9 is electrically interconnected with the ignition switch as well as the starter motor, characterized in that the engine will crank when turning the ignition key to "ON" position only after the seat belt is buckled.

* * * * *